United States Patent [19]
Ozawa et al.

[11] Patent Number: 5,542,104
[45] Date of Patent: Jul. 30, 1996

[54] PORTABLE SATELLITE COMMUNICATION EQUIPMENT WITH FOLDABLE FLAT ANTENNAE COMMON TO BOTH TRANSMISSION AND RECEPTION

[75] Inventors: Hirohisa Ozawa; Shigeo Ogawa, both of Tokyo, Japan

[73] Assignee: NEC Corporation, Japan

[21] Appl. No.: 249,321

[22] Filed: May 26, 1994

[30] Foreign Application Priority Data

May 27, 1993 [JP] Japan ................................ 5-124547

[51] Int. Cl.⁶ ........................... H04B 1/38; H04B 7/04
[52] U.S. Cl. ........................... 455/89; 455/82; 455/129; 455/272; 455/282; 343/702; 343/872
[58] Field of Search ................ 455/82, 83, 89, 455/90, 101, 129, 272–274, 277.1, 277.2, 281, 282; 363/702, 872, 893

[56] References Cited

U.S. PATENT DOCUMENTS 4,716,576 12/1987 Sakai et al. .
5,203,018 4/1993 Hirose ................................. 455/101 X

FOREIGN PATENT DOCUMENTS

| 508567 | 2/1992 | European Pat. Off. . |
| 63-174431 | 7/1988 | Japan ........................................ 455/89 |
| 3-280625 | 12/1991 | Japan ...................................... 455/272 |
| 2240904 | 8/1991 | United Kingdom . |

OTHER PUBLICATIONS

Patent Abstracts of Japan, vol. 12, No. 447 (E–685) 24 Nov. 1988 & JP–A–63 174 431.

Primary Examiner—Chi H. Pham
Attorney, Agent, or Firm—Ostrolenk, Faber, Gerb & Soffen, LLP

[57] ABSTRACT

In a portable satellite communication equipment including a transponder for transmission and reception, and an antenna portion which is electrically coupled to the transponder, the antenna portion has first and second common flat antennae. The first and the second common flat antennae are common to both the transmission and the reception and are foldably coupled to each other.

10 Claims, 4 Drawing Sheets

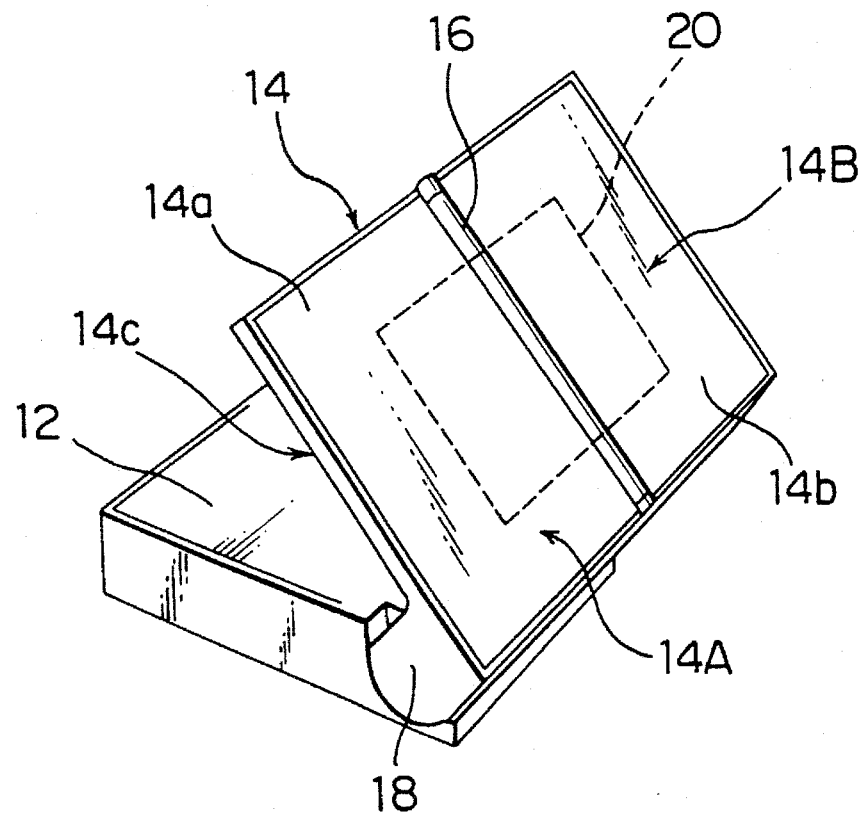
FIG. I(A)
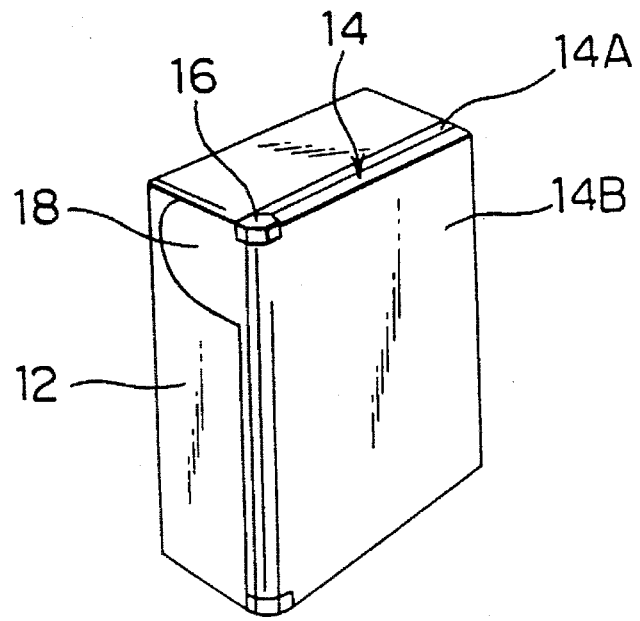
FIG. I(B)

PORTABLE SATELLITE COMMUNICATION EQUIPMENT WITH FOLDABLE FLAT ANTENNAE COMMON TO BOTH TRANSMISSION AND RECEPTION

BACKGROUND OF THE INVENTION

This invention relates to a portable satellite communication equipment.

In the last few years, a portable satellite communication equipment, which has a parabolic or a flat antenna, has been introduced to the market.

It is required that such a portable satellite communication equipment is small in size and light in weight. In this connection, the portable satellite communication equipment having the flat antenna was easier to transport and beneficial to users.

To increase the portability of such equipment, a portable satellite communication equipment using several flat antennae that could be folded up for transportation had been proposed. An example of such a conventional portable satellite communication equipment is disclosed in Unexamined Japanese Patent Application No. Shô 63-174431, namely, 174431/1988.

This portable satellite communication equipment comprises a flat reception antenna and a flat transmission antenna which are foldably coupled to each other. As a result, the portable satellite communication equipment disclosed in the above-referenced application was smaller in size than that having a parabolic antenna.

However, no consideration was made about the possibility that the portable satellite communication equipment could have a plurality of flat antennae each having both transmission and reception functions.

In the portable satellite communication equipment disclosed in the above-referenced application, one antenna was for transmission and the other for reception, and despite having two antennae, only one could be used at a time. This was the limit for the conventional portable satellite communication equipment in terms of small size and light weight.

SUMMARY OF THE INVENTION

It is therefore an object of this invention to provide a portable satellite communication equipment which is sufficiently small and light.

Other objects of this invention will become clear as the description proceeds.

According to an aspect of this invention, there is provided a portable satellite communication equipment comprising: a terminal for transmission and reception; and an antenna portion which is electrically coupled to the terminal and which comprises first and second common flat antennae. The first and the second common flat antennae are common to both the transmission and the reception and foldably coupled to each other.

On describing the gist of the present invention, it is possible to understand that the terminal is supplied with a baseband transmission signal, originally from a telephone or a fax and produces a decoded baseband reception signal towards the data terminal, and that the antenna portion transmits a microwave transmission radio signal and receives a microwave reception radio signal.

In accordance with this invention, the above-understood terminal includes: an interface for connecting the telephone/fax with the terminal; a baseband processing portion which receives voice or facsimile signals from the telephone or the fax via the interface and which codes the voice or facsimile signal into a coded baseband transmission signal and decodes a converted baseband reception signal into the voice or facsimile signal; a transmission signal processing portion which converts the coded baseband transmission signal into a converted microwave transmission signal; a reception signal processing portion which converts a filtered microwave reception signal into the converted baseband reception signal; a duplexer which selectively filters the converted microwave transmission signal and a mixed microwave reception signal into a filtered microwave transmission signal and the filtered microwave reception signal. The above-understood antenna portion includes: a distributor which distributes the filtered microwave transmission signal into the first and the second common flat antennae, respectively, and which mixes a microwave reception signal received from the first and the second common flat antennae, respectively.

The antenna portion may have a primary hinge by which the first and the second common flat antennae are folded together.

The terminal may have a secondary hinge by which the antenna portion is connected to the terminal and by which the antenna portion can be folded on top of the terminal.

BRIEF DESCRIPTION OF THE DRAWING

FIG. 1(A) is a schematic perspective view of a portable satellite communication equipment according to a first embodiment of the present invention, in which first and second common flat antennae are fully opened;

FIG. 1(B) is a schematic perspective view of the portable satellite communication equipment illustrated in FIG. 1(A), in which an antenna portion is completely folded;

DESCRIPTION OF THE PREFERRED EMBODIMENT

Figure 2:
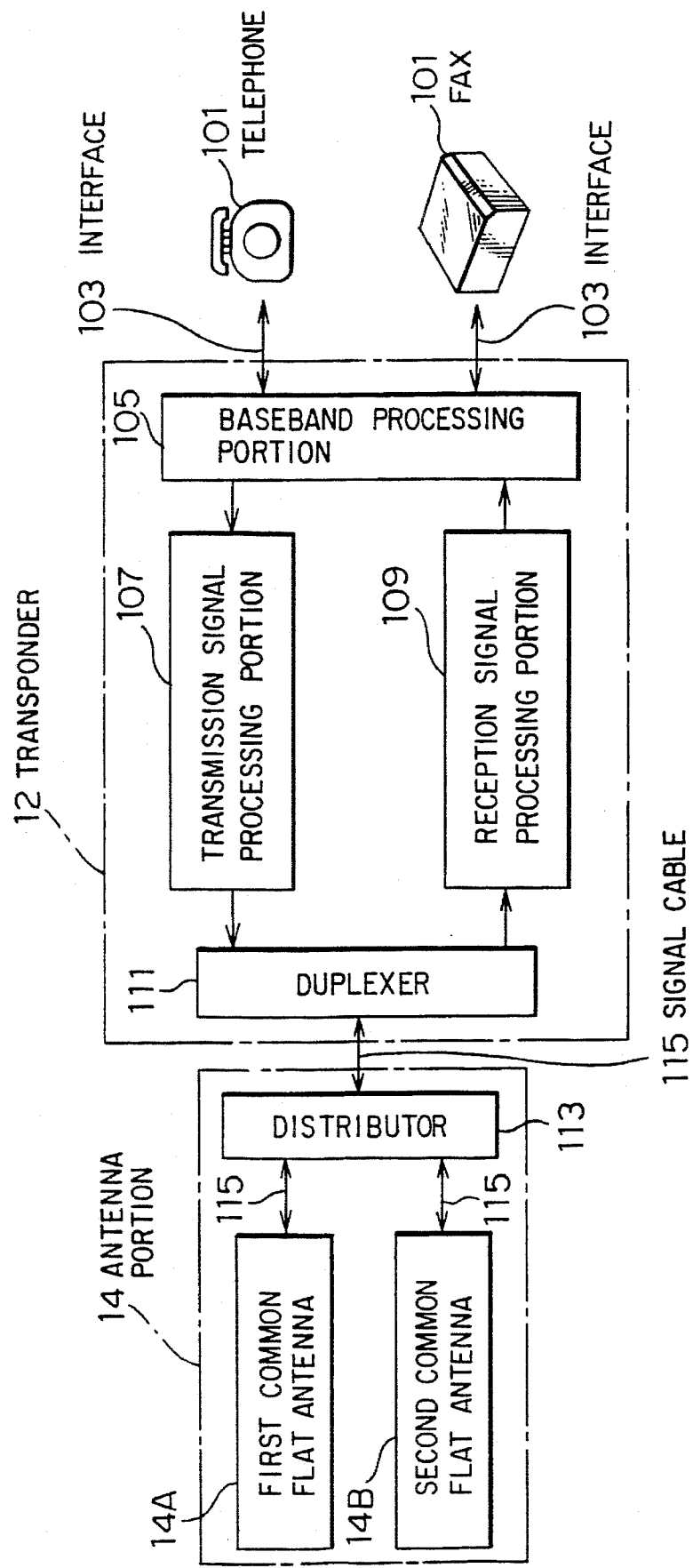
FIG. 2 is a block diagram of the portable satellite communication equipment illustrated in FIGS. 1(A) and (B)

Referring to FIGS. 1(A), 1(B), and 2, description is made about a portable satellite communication equipment according to a first embodiment of this invention.

In FIG. 1(A), the portable satellite communication equipment comprises a terminal 12 for transmission and reception, and an antenna portion 14 which is electrically coupled to the terminal 12. The terminal 12 includes a transmitter/receiver, and is typically referred to as a transponder. The antenna portion 14 comprises first and second common flat antennae 14A and 14B. The first and the second common flat antennae 14A and 14B are common to both the transmission and the reception.

The antenna portion 14 has a primary hinge 16 by which the first and the second common flat antennae 14A and 14B are folded together.

The terminal 12 has a secondary hinge 18 by which the antenna portion 14 is connected to the terminal 12 and folded on top when not in use. The secondary hinge 18 serves as a member for adjusting the antenna portion 14 to a predetermined elevation angle and for supporting the antenna portion 14 at the elevation angle.

The primary hinge 16 and the secondary hinge 18 are substantially perpendicular to each other.

Each of the first and the second common flat antennae 14A and 14B has a front surface 14a or 14b and a plurality of antenna elements (not shown) arranged on the front surface 14a or 14b.

The first and the second common flat antennae 14A and 14B are folded to keep the front surfaces 14a and 14b opposed to each other on folding. Namely, let an aperture angle of the antenna portion 14 be null, and the first and the second common flat antenna 14A and 14B are folded in such manner. Further, let an angle between the folded antenna portion 14 and the terminal 12 be null, the antenna portion 14 and the terminal 12 are thereby folded. As a result, the portable satellite communication equipment is completely folded, as illustrated in FIG. 1(B).

As mentioned above, the first and the second common flat antennae 14A and 14B are folded to keep the front surfaces 14a and 14b opposed to each other on folding. The antenna elements (not shown) arranged on the front surface 14a or 14b can be prevented from collision and from being damaged during transportation of the portable satellite communication equipment.

As illustrated in FIG. 2, the terminal 12 includes an interface 103, a baseband processing portion 105 which is connected to the interface 103, a transmission signal processing portion 107, a reception signal processing portion 109, a duplexer 111. On the other hand, the antenna portion 14 includes a distributor 113 in addition to the above-mentioned first and second common flat antennae 14A and 14B. The antenna portion 14 further includes a signal cable 115 which connects the duplexer 111 with the first and the second common flat antennae 14A and 14B thorough the distributor 113. Besides, the transmission signal processing portion 107 and the reception signal processing portion 109 include a plurality of power amplifiers and radiators set in a certain format, although they are not shown in FIG. 2.

Referring to FIGS. 1(A) and 2, description is made about each operation of the transmission and the reception in the illustrated portable satellite communication equipment.

As illustrated in FIG. 2, the baseband processing portion 105 connected to the interface 103 is supplied with a voice signal or a facsimile signal from a telephone or a fax 101. The baseband processing portion 105 codes the voice or the facsimile signal into a coded baseband transmission signal. The transmission signal processing portion 107 converts the coded baseband transmission signal into a converted microwave transmission signal. The duplexer 111 selectively filters the converted microwave transmission signal into a filtered microwave transmission signals. The distributor 113 distributes the filtered microwave transmission signal into the first and the second common flat antennae 14A and 14B, respectively. Each of the first and the second common flat antennae 14A and 14B then transmits a microwave transmission radio signal towards a satellite (not shown) with the antenna portion 14 kept at the above-mentioned predetermined elevation angle, as illustrated in FIG. 1(A).

On the other hand, each of the first and the second common flat antennae 14A and 14B receives a microwave reception radio signal from the satellite (not shown). The distributor 113 mixes a microwave reception signal received from the first and the second common flat antennae 14A and 14B. The duplexer 111 selectively filters a mixed microwave reception signal into a filtered microwave reception signal. The reception signal processing portion 109 converts the filtered microwave reception signal into a converted baseband reception signal. The baseband processing portion 105 decodes the converted baseband reception signal into a decoded baseband reception signal. The decoded baseband reception signal is received by the telephone or the fax 101 as a voice signal or a facsimile signal.

As mentioned above, in the illustrated portable satellite communication equipment, the antenna portion 14 comprises first and second common flat antennae 14A and 14B which are common to both the transmission and the reception. As a result, each of the transmission and the reception can be carried out on two flat antennae. Therefore, the illustrated portable satellite communication equipment can achieve an aperture area twice as large as that of the conventional portable satellite communication equipment described in the preamble of the instant specification. Accordingly, it becomes possible that an output power of the power amplifiers included an the transmission signal processing portion 107 be reduced to be as half as that of the conventional portable satellite communication equipment. It is thereby possible to reduce the number of the power amplifiers. In addition, heat generated by the power amplifiers can also be reduced. Consequently, it comes to be possible that small radiators be employed therefor. Thus, the transmission signal processing portion 107 can be reduced in size and weight. The reception signal processing portion 109 can also be reduced in size and weight, completely like the transmission signal processing portion 107.

Therefore, the portable satellite communication equipment can become smaller in size and lighter in weight than the conventional portable satellite communication equipment.

Figure 3:
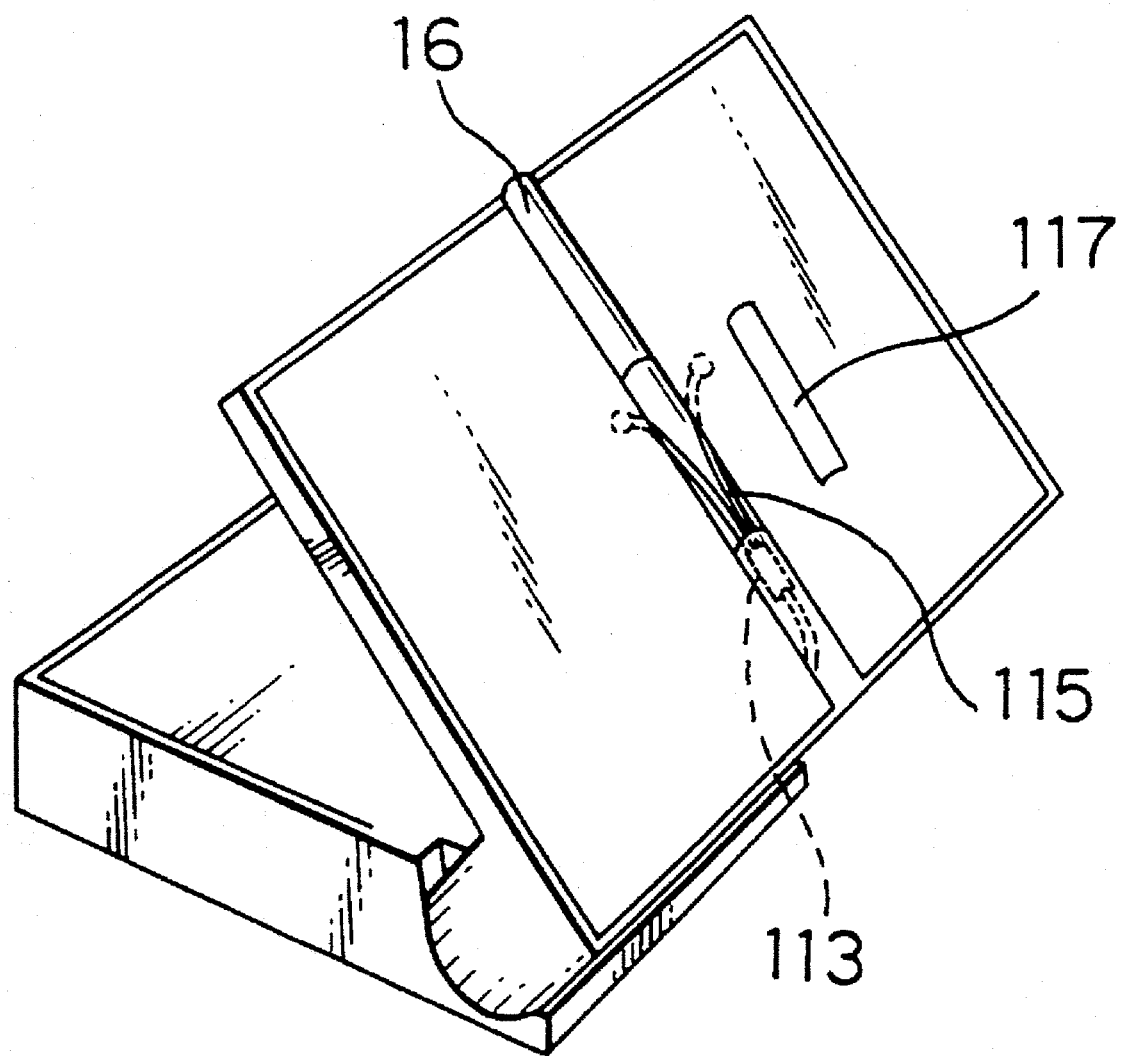
FIG. 3 is a schematic perspective view of a portable satellite communication equipment according to a modification of the first embodiment of the present invention.

Referring to FIG. 3, description is now made about a portable satellite communication equipment according to a modification of the first embodiment.

In the example being illustrated, the signal cable 115 and the distributor 113 are contained in the primary hinge 16. The signal cable 115 and the distributor 113 are shaded by a cover 117. In this way, the portable satellite communication equipment is well-designed in appearance. In addition, the signal cable 115 can be prevented from collision and from being damaged during a transfer of the portable satellite communication equipment.

In the above-described portable satellite communication equipment, the terminal 12 is provided in the manner that the terminal 12 is contained in a housing body. However, as symbolized by a broken-line block 20 in FIG. 1(A), the terminal may be united with the antenna portion 14 in the side of a back surface 14c.

Figure 4:
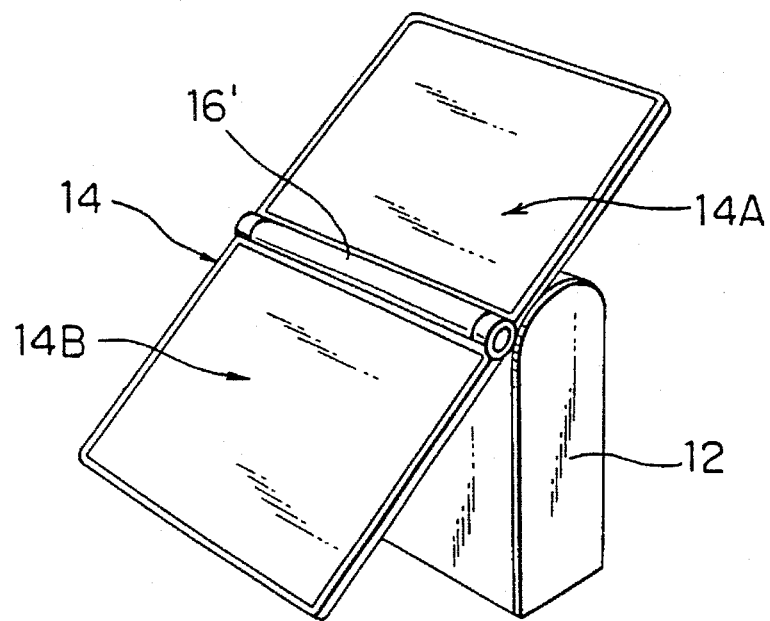
FIG. 4 is a schematic perspective view of a portable satellite communication equipment according to a second embodiment of the present invention, in which first and second common flat antennae are fully opened.
Figure 5:
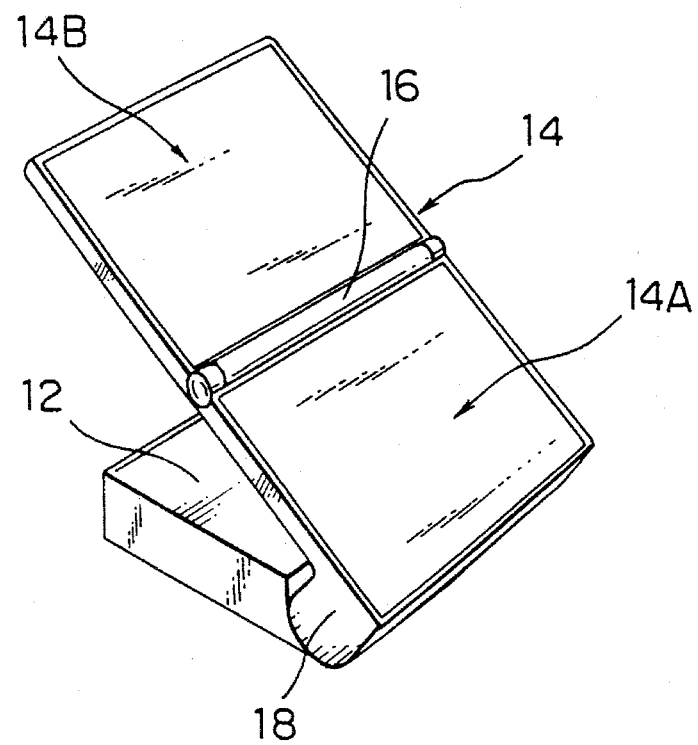
FIG. 5 is a schematic perspective view of a portable satellite communication equipment according to a third embodiment of the present invention, in which first and second common flat antenna are fully opened.

Referring to FIGS. 4 and 5, description is made about a portable satellite communication equipment according to second and third embodiments of the present invention.

In the example illustrated in FIG. 4, the first and the second common flat antennae 14A and 14B are foldably connected to each other by a primary hinge 16'. The antenna portion 14 is foldably connected to the transponder 12 also by the primary hinge 16'.

On the contrary, in the example illustrated in FIG. 5, the illustrated portable satellite communication equipment has a secondary hinge 18, like the above-mentioned first embodiment. The primary hinge 16 and the secondary hinge 18 are substantially parallel to each other while they are substantially perpendicular to each other in the first embodiment.

While this invention has thus far been described in specific conjunction with only several embodiments thereof, it will now be readily possible for one skilled in the art to put this invention into effect in various other manners. For example, the number of the common flat antennae is not restricted to two. Further common flat antennae may be added to the first and the second common flat antennae, provided that they can be foldably coupled to the first or the second common flat antenna.

What is claimed is:

1. A portable satellite communication equipment, comprising:

a terminal for transmission and reception;

an antenna portion which is electrically coupled to said terminal and which includes first and second common flat antennae, said first and said second common flat antennae being common to both said transmission and said reception and being foldably coupled to each other;

a primary hinge in said antenna portion and by which said first and second common flat antennae are foldably coupled to each other;

a distributor which distributes a microwave transmission signal to said first and second common flat antennae, respectively, and which mixes a microwave reception signal received from said first and second common flat antennas, respectively;

a signal cable which connects said distributor to each of said first and second common flat antennae; and said distributor and said signal cable being contained in said primary hinge.

2. A portable satellite communication equipment as claimed in claim 1, said terminal being supplied with a voice or a facsimile signal from a telephone or a fax and producing a decoded baseband reception signal towards said telephone or said fax, said antenna portion transmitting a microwave transmission radio signal and receiving a microwave reception radio signal, said terminal including:

an interface for connecting said telephone or said fax with said terminal;

a baseband processing portion which is connected to said interface and which codes said voice or said facsimile signal into a coded baseband transmission signal and decodes a converted baseband reception signal into said voice or said facsimile signal;

a transmission signal processing portion which converts said coded baseband transmission signal into a converted microwave transmission signal;

a reception signal processing portion which converts a filtered microwave reception signal into said converted baseband reception signal; and a duplexer which selectively filters said converted microwave transmission signal and a mixed microwave reception signal into a filtered microwave transmission signal and said filtered microwave reception signal.

3. A portable satellite communication equipment as claimed in claim 2, wherein said signal cable in said primary hinge in said antenna portion connects said duplexer with said first and said second common flat antennae through said distributor.

4. A portable satellite communication equipment as claimed in claim 3, each of said first and said second common flat antennae having a front surface and a plurality of antenna elements arranged on said front surface, wherein said first and said second common flat antennae are folded to keep said front surfaces opposed to each other on folding.

5. A portable satellite communication equipment as claimed in claim 4, said antenna portion having a back surface, wherein said terminal is united with said antenna portion in the side of said back surface.

6. A portable satellite communication equipment as claimed in claim 4, wherein said antenna portion is also foldably connected to said terminal by said primary hinge.

7. A portable satellite communication equipment as claimed in claim 4, wherein said terminal has a secondary hinge, said antenna portion being foldably connected to said terminal by said secondary hinge.

8. A portable satellite communication equipment as claimed in claim 7, wherein said primary hinge and said secondary hinge are substantially perpendicular to each other.

9. A portable satellite communication equipment as claimed in claim 7, wherein said primary hinge and said secondary hinge are substantially parallel to each other.

10. A portable satellite communication equipment as claimed in claim 1, further comprising a cover which covers said distributor and said signal cable contained in said primary hinge, and thereby removal of said cover providing access to said distributor and signal cable.

* * * * *